(12) United States Patent
Martinez et al.

(10) Patent No.: US 7,343,918 B2
(45) Date of Patent: Mar. 18, 2008

(54) BREATHING GAS FEED ASSEMBLY FOR AIRCRAFT FLIGHT CREW, AND A STOWAGE BOX FOR AN EMERGENCY BREATHING MASK

(75) Inventors: Patrice Martinez, Le Perray en Yvelines (FR); Philippe Gerard, Beynes (FR); Benoit Lelievre, Igny (FR); Dominique Lemasson, Les Clayes sous Bois (FR)

(73) Assignee: Intertechnique (FR)

( * ) Notice: Subject to any disclaimer, the term of this patent is extended or adjusted under 35 U.S.C. 154(b) by 426 days.

(21) Appl. No.: 10/716,970

(22) Filed: Nov. 18, 2003

(65) Prior Publication Data

US 2004/0144384 A1    Jul. 29, 2004

(30) Foreign Application Priority Data

Dec. 24, 2002    (FR) .................................... 02 16679

(51) Int. Cl.
*A62B 7/00*    (2006.01)
*A62B 23/02*    (2006.01)

(52) U.S. Cl. ........................... 128/205.29; 128/205.22; 128/204.27; 128/204.28; 128/205.11; 128/201.29; 128/202.11; 128/202.19; 128/204.29; 128/205.13; 128/205.14; 128/205.15; 128/205.17; 220/817; 220/818; 220/840

(58) Field of Classification Search ........... 128/206.27, 128/200.24, 204.18, 206.21, 206.23, 205.25, 128/206.22, 206.24, 205.29, 205.22, 204.27, 128/204.28, 205.11, 201.29, 202.11, 202.19, 128/205.13, 205.14, 205.15, 205.17; 229/115; D29/625; 220/810, 817, 814, 822, 520, 845, 220/827, 837, 831, 832, 345.4, 818, 840; 12/204.29

See application file for complete search history.

(56) References Cited

U.S. PATENT DOCUMENTS

| | | | | |
|---|---|---|---|---|
| 1,170,797 A * | 2/1916 | Burroughs | .................. | 220/263 |
| 2,663,529 A * | 12/1953 | Lyttaker | ..................... | 248/147 |
| 3,620,403 A * | 11/1971 | Rump | ....................... | 220/4.24 |
| 4,023,874 A * | 5/1977 | Jong et al. | .................. | 312/291 |
| 4,154,237 A * | 5/1979 | Courter | .................. | 128/206.27 |
| 4,481,945 A * | 11/1984 | Levine | .................. | 128/206.27 |
| 4,664,108 A * | 5/1987 | Ansite | .................. | 128/202.26 |
| 4,690,300 A * | 9/1987 | Woods | .................. | 220/592.17 |
| 4,909,247 A * | 3/1990 | Terrisse et al. | ........ | 128/206.27 |
| 5,170,904 A * | 12/1992 | Neuhaus | .................... | 220/262 |
| 5,356,027 A * | 10/1994 | Craft et al. | ................. | 220/840 |
| 5,577,628 A * | 11/1996 | O'Neil et al. | .............. | 220/840 |
| 5,954,052 A * | 9/1999 | McDonald et al. | .... | 128/206.27 |
| 6,026,802 A * | 2/2000 | Patterson | .................... | 126/201 |
| 6,470,887 B1 * | 10/2002 | Martinez | ............... | 128/207.11 |
| 6,497,386 B2 * | 12/2002 | Martinez | ................. | 244/118.5 |
| 6,497,387 B2 * | 12/2002 | Martinez | ................. | 244/118.5 |
| 6,523,539 B2 * | 2/2003 | McDonald et al. | .... | 128/205.25 |

(Continued)

FOREIGN PATENT DOCUMENTS

| | | |
|---|---|---|
| FR | 2813062 | 2/2002 |
| WO | WO 90/02582 | 3/1990 |

OTHER PUBLICATIONS

Search Report issued in priority Application No. 0216679.

*Primary Examiner*—Patricia Bianco
*Assistant Examiner*—Nihir Patel
(74) *Attorney, Agent, or Firm*—Dean W. Russell; Kilpatrick Stockton LLP

(57) ABSTRACT

A breathing gas feed assembly for the flight crew of an airplane comprises an emergency breathing mask and a stowage box for the mask. The box is adapted to receive the mask diagonally and it is closed by two doors hinged about respective hinge axes situated on two adjacent edges of the box.

7 Claims, 3 Drawing Sheets

U.S. PATENT DOCUMENTS

| | | |
|---|---|---|
| 6,526,967 B2 * | 3/2003 | Cordero et al. ........ 128/200.24 |
| 6,626,317 B2 * | 9/2003 | Pfiefer et al. ............... 220/263 |
| 6,755,194 B2 * | 6/2004 | Taieb .................... 128/206.27 |
| 6,886,713 B1 * | 5/2005 | Scherrer ..................... 220/817 |
| 2002/0189617 A1 | 12/2002 | Cordero |
| 2003/0010341 A1 * | 1/2003 | Martinez et al. ....... 128/204.26 |

* cited by examiner

BREATHING GAS FEED ASSEMBLY FOR AIRCRAFT FLIGHT CREW, AND A STOWAGE BOX FOR AN EMERGENCY BREATHING MASK

The present invention relates to breathing gas feed assemblies for aircraft flight crew, in particular pilots, and to stowage boxes for emergency breathing masks for such crew members.

In particular, the invention relates to a stowage box for an emergency breathing mask for flight crew, the box comprising a frame forming a receptacle for the mask, itself having an open face of rectangular shape for inserting and extracting the mask, and at least two doors closing the open face of the frame, at least in part.

BACKGROUND OF THE INVENTION

Boxes of this type are already known, and the mask is extracted through a face that is closed by two doors that retain the mask, each opening and closing about a respective hinge, the two hinges of the doors operating about two parallel hinge axes.

The inventors have observed that in some circumstances it is difficult or not advantageous to house the mask with its oro-nasal plane of symmetry parallel to the two sides of the open face. In particular, it is becoming more and more frequent to provide masks with a shield for providing protection against smoke, which means that their maximum dimension extends transversely to the plane of symmetry. In order to take this situation into account, the inventors have found that it is possible to provide a box of rectangular section, in particular of square section, in such a manner as to place the mask therein and to extract it therefrom with the oro-nasal plane of symmetry of the mask being disposed diagonally relative to two parallel main faces of the box.

The inventors then found that under such circumstances extracting the mask from the box having two doors turning about two parallel axes leads to difficulties that lengthen the time taken to extract the mask from the box, whereas in the event of an emergency this time should be as short as possible.

OBJECTS AND SUMMARY OF THE INVENTION

An object of the invention is specifically to provide a mask box that is better than previously known mask boxes at satisfying practical requirements in numerous situations.

To this end, in one aspect of the invention, there is provided a box having two doors that are hinged about respective hinge axes situated on two adjacent edges of the open face, and extending substantially perpendicularly to each other. Usually, these two doors are the only doors of the box.

By means of these dispositions, it is easy to open the doors and extract the mask when the user pulls on the mask, forcing the doors in the opening or outward direction, even when the mask is oriented with its oro-nasal plane of symmetry diagonally relative to the main faces of the box. In this particular circumstance, on being extracted, the mask applies symmetrical and substantially equivalent action against each of the two doors. The time required for extracting the mask from the box, and for putting the mask into place on the user's face can then be made shorter than the five seconds required by regulations.

In advantageous embodiments of the invention, recourse may possibly also be made to one or more of the following dispositions:

- the box comprises two doors each substantially in the form of a triangular plate, with a vertex having two sides forming a right angle, one of these sides being hinged about one of the two hinge axes;
- each of the doors has a diagonal edge interconnecting the two sides of the vertex forming a right angle, said diagonal edge including a notch that is symmetrical about the bisector of the angle between the two hinge axes with the corresponding notch in the edge of the other door; the notch in each door is situated at the opposite end of the diagonal edge from the point of intersection between the two hinge axes;
- the open face is substantially square in shape;
- the box has a pneumatic assembly in the frame for controlling the feed of breathing gas to the breathing mask and interacting with one of the doors, said pneumatic assembly being positioned close to the angle extending between the two hinge axes; and
- one of the doors is provided with a control assembly for co-operating with the pneumatic assembly to control the feed of breathing gas to the breathing mask, the control assembly being situated close to the hinge axis of said door.

In another aspect, the invention provides a breathing gas feed assembly for the flight crew of an airplane, the assembly comprising:

- an emergency breathing mask having a breathing gas delivery device; and
- a box as defined above, the box being adapted to receive the mask oriented in the frame so that the breathing gas delivery device occupies a corner of the open face that is opposite from the corner corresponding to the point of intersection of the hinge axes.

Often, in this assembly, the mask has handle lugs, the doors of the box being adapted so that the handle lugs project at least in part from the open face, passing beyond the notches formed in the doors so as to enable the mask to be grasped even when the doors are closed.

The invention also seeks to provide an advantageous solution to the need to make best possible use of the space available under the instrument panel or console of an airplane. Often the width available for housing a mask is limited, to such an extent that is not possible to place a mask, and in particular a mask having a shield, therein in the usual orientation. In another aspect of the invention, this difficulty is overcome by a breathing gas feed assembly for a member of the flight crew of an airplane, the assembly comprising:

- an emergency breathing mask provided with a regulator for connection to a flexible hose for feeding breathing gas, generally oxygen; and
- a mask-receiving box forming a receptacle having an open face of rectangular shape for inserting and extracting the mask oriented diagonally relative to the sides of the open face, the open face being provided with two doors movable between a closed position in which they close the open face while leaving a fraction of the regulator projecting, and an outwardly open position enabling the mask to pass through, the doors pivoting on respective edges of the open face about respective axes occupying two adjacent sides of the open face. The doors are then normally designed so that on being opened they open the supply of breathing gas to the feed hose which is stored in the box together with the mask.

The two doors are advantageously approximately triangular in shape with adjacent cutouts defining an opening close to the corner of the open face that is furthest from the point where the pivot axes intersect so as to allow the projecting fraction of the regulator to pass through. This disposition enables the user to withdraw the mask with a minimum of hindrance for the hand.

BRIEF DESCRIPTION OF THE DRAWINGS

Other aspects, objects, and advantages of the invention appear on reading the following description of an embodiment thereof.

The invention will also be better understood with the help of the drawings, in which.

MORE DETAILED DESCRIPTION

In the various figures, elements that are identical or similar are designated by the same references.

In the embodiment shown in FIGS. 1 to 3, and described below, the breathing gas feed assembly of the invention comprises a box 1 that is substantially in the form of a rectangular parallelepiped having a square front face 2.

Figure 1:
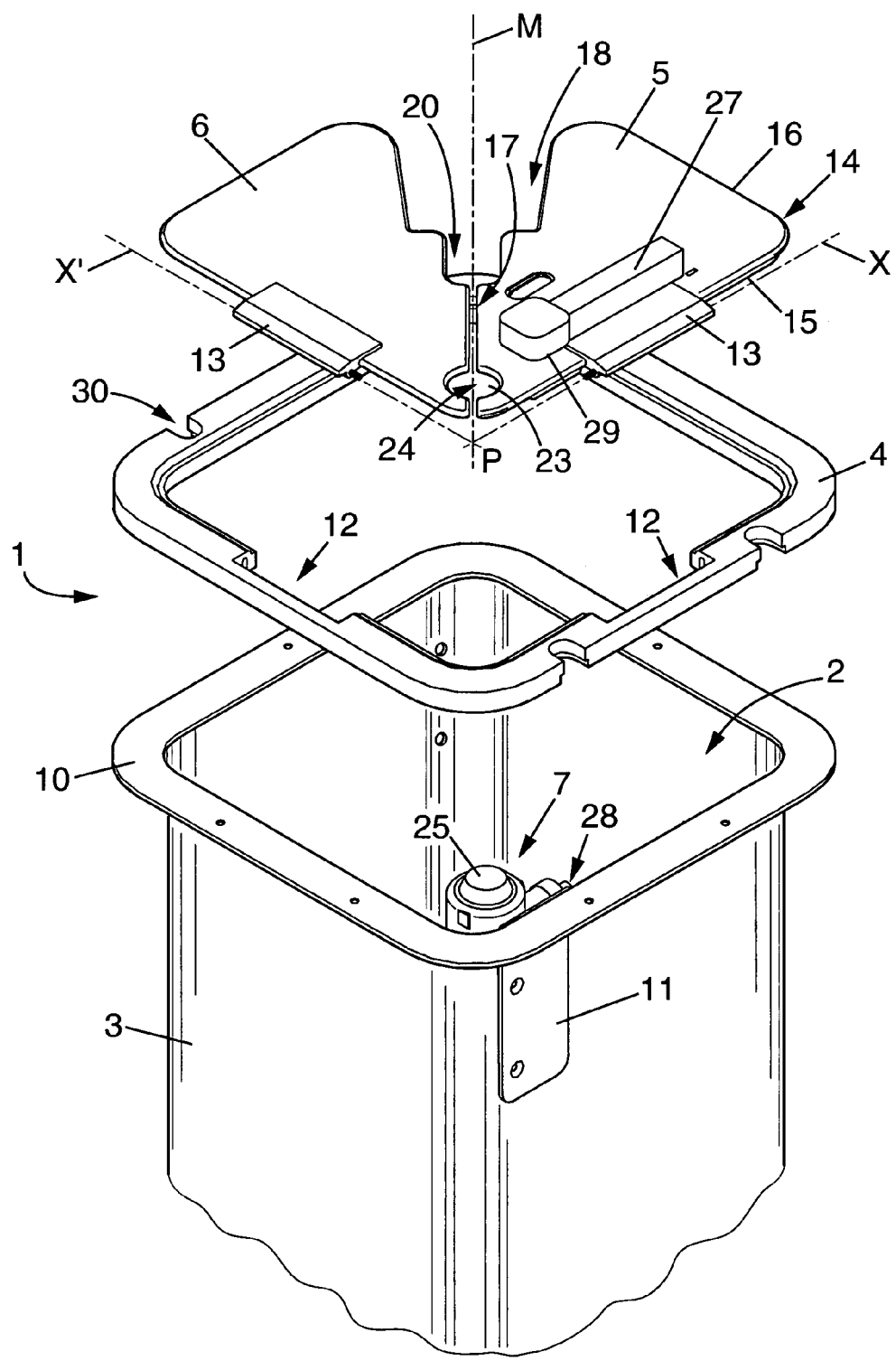
FIG. 1 is a diagrammatic perspective view of a box constituting a feed assembly of the invention.

As shown in FIG. 1, the box 1 comprises a frame 3, a surround 4, doors 5 and 6, and a pneumatic assembly 7.

Figure 2:
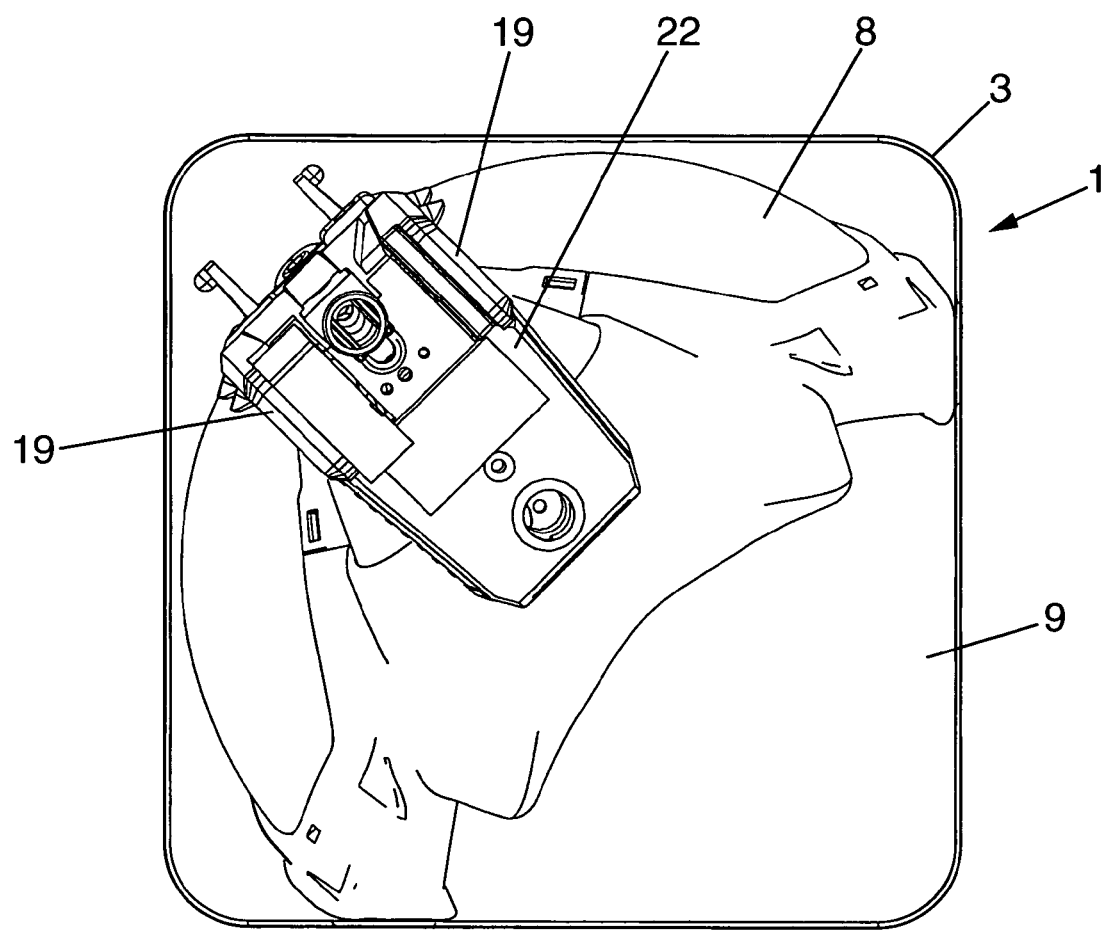
FIG. 2 is a diagrammatic plan view of the box of the assembly shown in FIG. 1, omitting the doors that cover its open face.

The box 1 serves to stow an emergency breathing mask 8 for flight crew members of an airplane (see FIG. 2). The frame 3 is inserted in the cockpit console of the airplane in question. This console is entirely conventional in type and it is not described in the present document.

The frame 3 serves to support the other components of the box 1 and provides the mechanical interface with the console. As shown in FIG. 1, the frame 3, which forms a receptacle for the mask 8, is in the form of a tube of substantially square section. It has an open face 9 for inserting or extracting the mask 8. The open face 9 is surrounded by a rim 10 extending perpendicularly outwards from the walls of the tube constituting the frame 3. The rim 10 has fixing tabs 11 to enable a control cock of the pneumatic assembly 7 to be fixed in the box 1. The frame 3 is fixed to the cockpit console by means that engage in notches 30 in the surround 4.

In a variant, the frame 3 may be no more than a simple sash analogous to the surround 4.

The surround 4 is square in shape with two adjacent sides including notches 12 for receiving and hinging fittings 13 secured to the doors 5 and 6. The surround 4 is fixed to the rim 10. It surrounds the open face 9.

The fittings 13 are hinged in the notches 12, about respective hinge axes X and X' that are mutually perpendicular.

The doors 5 and 6 are each substantially in the form of a triangular plate. The plate has a vertex 14 and two sides 15, 16 forming a right angle. The side 15 is hinged about one of the two hinge axes X, X' (e.g. X).

Each door 5, 6 also has a diagonal edge 17 interconnecting the two sides 15, 16 extending from the right-angled vertex 14. This diagonal edge 17 has a notch 18. The notch 18 is symmetrical about the bisector M of the angle between the two hinge axes X, X' to the corresponding notch in the diagonal edge of the other door. The notch 18 in each door 5, 6 is situated at the end of the corresponding diagonal edge 17 that is remote from the point of intersection P between the two hinge axes X and X'.

Figure 3:
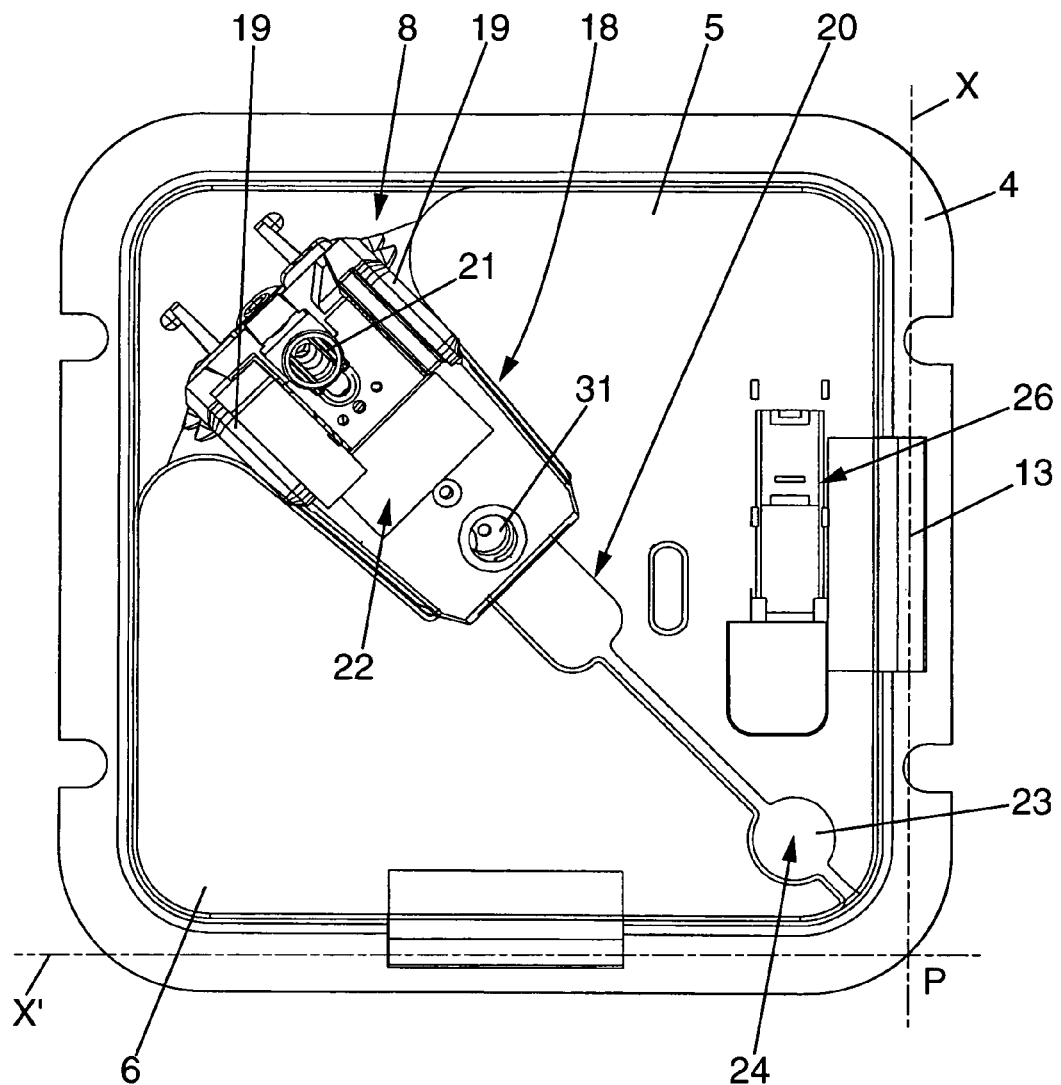
FIG. 3 is a view analogous to that of FIG. 2 showing the box shown in FIGS. 1 and 2, but with the doors that cover its open face being shown closed.

As shown in FIG. 3, the doors 5 and 6 provide partial protection for the mask 8 and they also serve to hold it while it is being stowed, i.e. while it is not in use. In this stowage situation, a portion of the mask 87 forming handle lugs 19 projects proud of the open face 9 beyond the box 1 via the notches 18. This enables the mask 8 to be grasped even when the doors 5 and 6 are closed. Each notch 18 is of a shape suitable for going round the projecting portions of the handle lugs 19.

As shown in FIGS. 1 and 3, each notch 18 continues along each diagonal edge 17 towards the point of intersection P between the two hinge axes X and X' by means of a setback 20 for passing a feed tube (not shown). This feed tube serves to feed the mask 8 with breathing gas. The feed tube is screwed to an orifice 21 of a breathing gas delivery device such as a demand regulator 22 fitted to the mask 8. A test button 31 for testing the operation of the regulator 22 is accessible in the notches 18 so as to enable the mask 8 to be tested in situ.

A half-opening 23 is also formed in the diagonal edge 17 close to the point of intersection P between the two hinge axes X and X'. Together the two half-openings 23 form a circular window 24 which coincides with a pneumatic indicator 25 of the pneumatic assembly 7 (see FIG. 1).

One of the doors 5, 6 has a chamber 26 for receiving a control assembly 27 which is shown only in FIG. 1. This control assembly 27 applies pressure on a control pin 28 of a cock of the pneumatic assembly 7.

While the mask 8 is being extracted, the two doors 5 and 6 open to allow the mask 8 to pass through. The control pin 28 as released in this way allows the cock of the pneumatic assembly 7 to open. This cock opens and feeds breathing gas to the regulator 22.

When the door 5 is re-closed, a portion of the control assembly 27 retracts (as explained in patent document FR-A-2 813 062) and enables the cock to remain open, while still informing the user that it is open by means of the indicator 25 that is visible through the window 24.

Opening the cock actuates an electric switch which serves to turn on an audio unit situated on the mask and/or to send information to the on-board telephone concerning the use of the mask 8.

When a user makes use of the mask 8, the indicator 25 informs the user that the mask is indeed being fed with breathing gas.

When the mask 8 is no longer in use, acting on a reset switch 29 enables the feed of breathing gas to the mask 8 to be interrupted and enables an opening indicator to be reinitialized (as explained in document FR-A-2 813 062) concerning the pneumatic assembly 7, and also enables the electric circuit of the feed assembly of the invention to be reinitialized.

To stow the mask 8, the two doors 5 and 6 are opened. The mask 8 can then be inserted in the box 1. The two doors 5 and 6 are then re-closed. Acting on the switch 29 reinitializes the feed assembly of the invention.

The box 1 presents the advantage of being suitable for placing to the right or the left of a user. When the box 11 is placed to the right of a user the notches 18 are positioned top left. When the box 1 is situated to the left of the user, the notches 18 are positioned top right relative to the box 1. It is thus possible to place the box 1 equally well the right or to the left of a user merely by turning it through 90° about the point of intersection P between the two hinges X and X'.

What is claimed is:

1. A stowage box for an emergency breathing mask for the flight crew of an airplane, the box comprising:
    means for receiving the mask, such means comprising a frame forming a receptacle for the mask, the frame having an open face through which the mask is inserted and extracted; and
    at least two doors closing the open face of the frame, at least in part, the two doors being hinged about two hinge axes situated respectively on two adjacent edges of the open face and substantially perpendicular to each other, each of the doors (i) being substantially in the form of a triangular plate, with a vertex having two sides forming a right angle, one of these sides being hinged about one of the two hinge axes and (ii) having a diagonal edge interconnecting the two sides of the vertex forming a right angle, said diagonal edge including a notch that is symmetrical about the bisector of the angle between the two hinge axes with the corresponding notch in the edge of the other door; and
    in which the notch in each door is situated at the opposite end of the diagonal edge from the point of intersection between the two hinge axes.

2. A box according to claim 1, in which the open face is substantially square in shape.

3. A box according to claim 1, having a pneumatic assembly in the frame for controlling the feed of breathing gas to the breathing mask and interacting with one of the doors, said pneumatic assembly being positioned close to the angle extending between the two hinge axes.

4. A box according to claim 3, in which one of the doors is provided with a control assembly for co-operating with the pneumatic assembly to control the feed of breathing gas to the breathing mask, the control assembly being situated close to the hinge axis of said door.

5. A breathing gas feed assembly for the flight crew of an airplane, the assembly comprising:
    an emergency breathing mask having a breathing gas delivery device; and
    a box comprising (i) means for receiving the mask, such means comprising a frame forming a receptacle for the mask, the frame having an open face through which the mask is inserted and extracted; and (ii) at least two doors closing the open face of the frame, at least in part, the two doors being hinged about two hinge axes situated respectively on two adjacent edges of the open face and substantially perpendicular to each other, the box being adapted to receive the mask oriented in the frame so that the breathing gas delivery device occupies a corner of the open face that is opposite from the corner corresponding to the point of intersection of the hinge axes.

6. An assembly according to claim 5, in which the mask has handle lugs, the doors of the box being adapted so that the handle lugs project at least in part from the open face, passing beyond the notches formed in the doors so as to enable the mask to be grasped even when the doors are closed.

7. A breathing gas feed assembly for a member of the flight crew of an airplane, the assembly comprising:
    an emergency breathing mask provided with a regulator for connection to a flexible hose for feeding breathing gas, generally oxygen; and
    a mask-receiving box forming a receptacle having an open face of rectangular shape for inserting and extracting the mask oriented diagonally relative to the sides of the open face, the open face being provided with two doors movable between a closed position in which they close the open face while leaving a fraction of the regulator projecting, and an outwardly open position enabling the mask to pass through, the doors pivoting on respective edges of the open face about respective axes occupying two adjacent sides of the open face.

* * * * *